(12) United States Patent
Ishikawa et al.

(10) Patent No.: US 7,719,283 B2
(45) Date of Patent: *May 18, 2010

(54) SWITCHING CIRCUIT AND VOLTAGE MEASURING CIRCUIT

(75) Inventors: Satoshi Ishikawa, Haibara-gun (JP); Kouichi Yamamoto, Susono (JP)

(73) Assignee: Yazaki Corporation, Tokyo (JP)

( * ) Notice: Subject to any disclaimer, the term of this patent is extended or adjusted under 35 U.S.C. 154(b) by 362 days.

This patent is subject to a terminal disclaimer.

(21) Appl. No.: 11/002,236

(22) Filed: Dec. 3, 2004

(65) Prior Publication Data

US 2005/0270811 A1 Dec. 8, 2005

(30) Foreign Application Priority Data

Jun. 4, 2004 (JP) .......................... P.2004-167135

(51) Int. Cl.
*G01N 27/416* (2006.01)
*H02J 7/00* (2006.01)
(52) U.S. Cl. ...................................... 324/434; 320/116
(58) Field of Classification Search ......... 324/426–434, 324/442; 320/116, 119, 120; 702/57, 64
See application file for complete search history.

(56) References Cited

U.S. PATENT DOCUMENTS 5,249,141 A * 9/1993 Vandebroek et al. ........ 702/132
5,804,944 A * 9/1998 Alberkrack et al. ......... 320/163
6,104,164 A   8/2000 Iino et al.
6,262,494 B1 * 7/2001 Tsukuni et al. ............. 320/122
6,362,627 B1 * 3/2002 Shimamoto et al. ......... 324/434
7,194,362 B2 * 3/2007 Ishikawa et al. ............. 702/57

FOREIGN PATENT DOCUMENTS

| JP | 11-248755 A   | 9/1999  |
| JP | 11-248757 A   | 9/1999  |
| JP | 2000-199771 A | 7/2000  |
| JP | 2000-324711 A | 11/2000 |
| JP | 2002-156392 A | 5/2002  |
| JP | 2002-171681 A | 6/2002  |
| JP | 2003-14792 A  | 1/2003  |

OTHER PUBLICATIONS

Texas Instruments, Datasheets for TL601, Jun. 1976, Revised Oct. 1986, pp. 1-6.*

* cited by examiner

*Primary Examiner*—Bao Q Vu
*Assistant Examiner*—Jue Zhang
(74) *Attorney, Agent, or Firm*—Sughrue Mion, PLLC

(57) ABSTRACT

A switching circuit includes a capacitor, a combination battery having a plurality of unit cells connected in series, each of the unit cells containing battery, and a plurality of change-over switches sequentially connecting both ends of the each of the unit cells to the capacitor. The change-over switch has two semiconductor switches connected in series so that the source-drain directions thereof are oriented opposite to each other.

9 Claims, 4 Drawing Sheets

SWITCHING CIRCUIT AND VOLTAGE MEASURING CIRCUIT

BACKGROUND OF THE INVENTION

The present invention relates to a switching circuit and a voltage measuring circuit, and more particularly, the invention relates to a switching circuit for connecting both ends of each of the batteries connected in series to a capacitor, and a voltage measuring circuit having the switching circuit.

There has been proposed, for example, a related switching circuit of the sort mentioned above as shown in FIG. 5 (e.g. JP-A-11-248755 and JP-A-2002-156392). As shown in FIG. 5, the switching circuit has one capacitor C with respect to a plurality of unit cells $V_1$-$V_n$ connected in series and a plurality of change-over switches $S_1$-$S_{n+1}$ for sequentially connecting both ends of each of the unit cells $V_1$-$V_n$ to both ends of the capacitor C. In FIG. 5, each of the unit cells $V_1$-$V_n$ is formed with one battery.

The change-over switches $S_1$-$S_{n+1}$ are provided such that (n+1) pieces of the switches are provided for n pieces of unit cells $V_1$-$V_n$. More specifically, the plus side of the unit cell $V_1$ and the minus side of the unit cell $V_2$ connected to the plus side of the unit cell $V_1$ are connected to the capacitor C via the common change-over switches $S_2$. Further, there has been proposed another switching circuit such that as shown in FIG. 6 two of change-over switches $S_1$-$S_{2n}$ are provided on both sides of each of the unit cells $V_1$-$V_n$ (e.g., JP-A-11-248757).

In the related switching circuits shown in FIGS. 5 and 6, relay switches have been employed as the change-over switches $S_1$-$S_{n+1}$ and $S_1$-$S_{2n}$. However, the relay switch has a problem in respect of cost, size, durability and response speed; accordingly, there has developed a demand for use of semiconductor switches excellent in these respects as the change-over switches $S_1$-$S_{n+1}$ and $S_1$-$S_{2n}$.

Nevertheless, because a parasitic diode is present across the source-drain of the semiconductor switch, an electric current may flow via the parasitic diode even when the change-over switches $S_1$-$S_{n+1}$ and $S_1$-$S_{2n}$ are turned off, so that it is difficult attempting to completely insulate the unit cells $V_1$-$V_n$ from the capacitor C.

SUMMARY OF THE INVENTION

It is therefore an object of the invention to provide a switching circuit adaptable to employ semiconductor switches excellent in cost, size, durability, response speed and so on, and a voltage measuring circuit.

In order to achieve the above object, according to the present invention, there is provided a switching circuit, comprising:

a capacitor;

a combination battery, having a plurality of unit cells connected in series, each of the unit cells containing battery; and a plurality of change-over switches, sequentially connecting both ends of the each of the unit cells to the capacitor, wherein each of the change-over switches has two semiconductor switches connected in series so that the source-drain directions thereof are oriented opposite to each other.

In the above configuration, the semiconductor switch has two semiconductor switches connected in series with the source-drain directions oriented opposite to each other.

Therefore, the forward directions of parasitic diodes generated in the source-drain directions are oriented opposite to each other by connecting the two semiconductor switches so that the source-drain directions are oriented opposite to each other, whereby no current is allowed to flow through the parasitic diodes when the semiconductor switches are turned off.

Preferably, a minus side terminal of one of the unit cells and a plus side terminal of an adjoining unit cell connected to the minus side terminal of the one unit cell are connected to the capacitor via the common change-over switch.

In the case of the switching circuit according to the invention in which the minus side of one of the unit cells and the plus side of an adjoining unit cell connected to the one unit cell are connected to the capacitor via the common change-over switch, a two-way current is required to flow in the common change-over switch. Therefore, the two-way current can be made to flow therein by using the two semiconductor switches as change-over switches connected together with the source-drain directions oriented opposite to each other and moreover no current is allowed to flow through the parasitic diodes when the change-over switches are turned off.

Preferably, the switching circuit further includes a first logic circuit, outputting a control signal for designating the on-off of at least one of the semiconductor switches; and a level shift circuit, level shifting the control signal and feeding the level-shifted control signal to a gate of the at least one of the semiconductor switches.

According to the invention, the logic circuit outputs the control signal for designating the on-off of the semiconductor switches. The level shift circuit subjects the control signal to the level shifting and feeds the level-shifted signal into the gate of each semiconductor switch. Therefore, the on-off of the semiconductor switches with a high voltage applied to the sources can be controlled by level-shifting the control signal generated by the logic circuit of a low voltage system, whereby it is unnecessary to use expensive photo MOSs.

Preferably, the switching circuit includes a resistance element, provided across the source-gate of the respective semiconductor switches; drive capacitors, respectively connected to both ends of the resistance element; and an oscillation circuit, applying AC voltage to both ends of the resistance element via the drive capacitors.

According to the invention, a bias is applied across the source-gate of the semiconductor switch when the AC voltage is applied from the oscillation circuit via the drive capacitors to the resistance element, so that the two semiconductor switches can be turned on. With the arrangement above, as the oscillation circuit can be isolated by the drive capacitors from the combination battery in a direct-current mode, the oscillation circuit is allowed to make the lower voltage source a power supply, which is different from the combination battery.

Preferably, the switching circuit includes a drive switch, provided between the oscillation circuit and the drive capacitors; and a second logic circuit, outputting a control signal for designating the on-off of the drive switch.

According to the invention, the AC voltage is applied to the resistance element from the oscillation circuit via the drive capacitors when the drive switch is turned on. The on-off of the drive switch is controlled by the control signal from the logic circuit. With the arrangement above, only one oscillation circuit can be provided with respect to the plurality of change-over switches.

Preferably, the semiconductor switch connected to the plus side terminal of the unit cell located on the highest voltage side out of the change-over switches is of a P channel type; and the other of the conductor switches is a N channel type.

According to the invention, the semiconductor switch connected to the plus side of the unit cell located on the highest voltage side out of the change-over switches is of a Pch. type;

and the rest of the conductor switches are of a Nch. type. Therefore, use can be made of inexpensive Nch. semiconductor switches other than the semiconductor switch connected to the plus terminal of the unit cell that is located on the highest voltage side and unable to be turned on unless the Pch. semiconductor switch is used.

According to the present invention, there is also provided a voltage measuring circuit, comprising:

the switching circuit;

a voltage measuring unit, measuring the voltage across the capacitor; and a measuring switch, connected between both ends of the capacitor and the voltage measuring unit, wherein the measuring switch has two semiconductor switches connected in series with the source-drain directions oriented opposite to each other.

According to the invention, the measuring switch connected between both ends of the capacitor and the voltage measuring means has two semiconductor switches connected in series with the source-drain directions oriented opposite to each other. Therefore, the forward directions of the parasitic diodes generated in the source-drain directions are oriented opposite to each other by connecting the two semiconductor switches so that the source-drain directions are oriented opposite to each other, whereby no current is allowed to flow through the parasitic diodes when the semiconductor switches are turned off.

As set forth above, according to the invention, the forward directions of the parasitic diodes generated in the source-drain directions are oriented opposite to each other by connecting the two semiconductor switches so that the source-drain directions are oriented opposite to each other, whereby no current is allowed to flow through the parasitic diodes when the semiconductor switches are turned off. Consequently, it is feasible to obtain a switching circuit adaptable to employ the semiconductor switches as change-over switches.

According to the invention, using two semiconductor switches as the change-over switches connected such that the source-drain directions are oriented opposite to each other allows the two-way current to flow through the parasitic diodes; moreover, as no current is allowed to flow therethrough, it is also feasible to obtain a switching circuit that can employ the semiconductor switches as change-over switches.

According to the invention, the on-off of the semiconductor switches with a high voltage applied to the sources can be controlled by level-shifting the control signal generated by the logic circuit of a low voltage system, whereby it is unnecessary to use expensive photo MOSs, so that a switching circuit designed to reduce costs is obtainable.

According to the invention, as the oscillation circuit can be isolated by the drive capacitors from the combination battery in a direct-current mode, the oscillation circuit is allowed to make the lower voltage source a power supply, which is different from the combination battery, whereby a switching circuit which is inexpensive, highly efficient and simple in construction is obtainable.

According to the invention, as only one oscillation circuit can be provided with respect to the plurality of change-over switches, a switching circuit which is simple in construction and effects a reduction in costs is obtainable.

According to the invention, as use can be made of inexpensive Nch. semiconductor switches other than the semiconductor switch connected to the plus terminal of the unit cell that is located on the highest voltage side and unable to be turned on unless the Pch. semiconductor switch is used, a switching circuit effecting a reduction in costs is obtainable.

According to the invention, the forward directions of the parasitic diodes generated in the source-drain directions are oriented opposite to each other by connecting the two semiconductor switches so that the source-drain directions are oriented opposite to each other, whereby no current is allowed to flow through the parasitic diodes when the semiconductor switches are turned off. Accordingly, a voltage measuring circuit which is adaptable to employ semiconductor switches as measuring switches is available.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

First Embodiment

Figure 1:
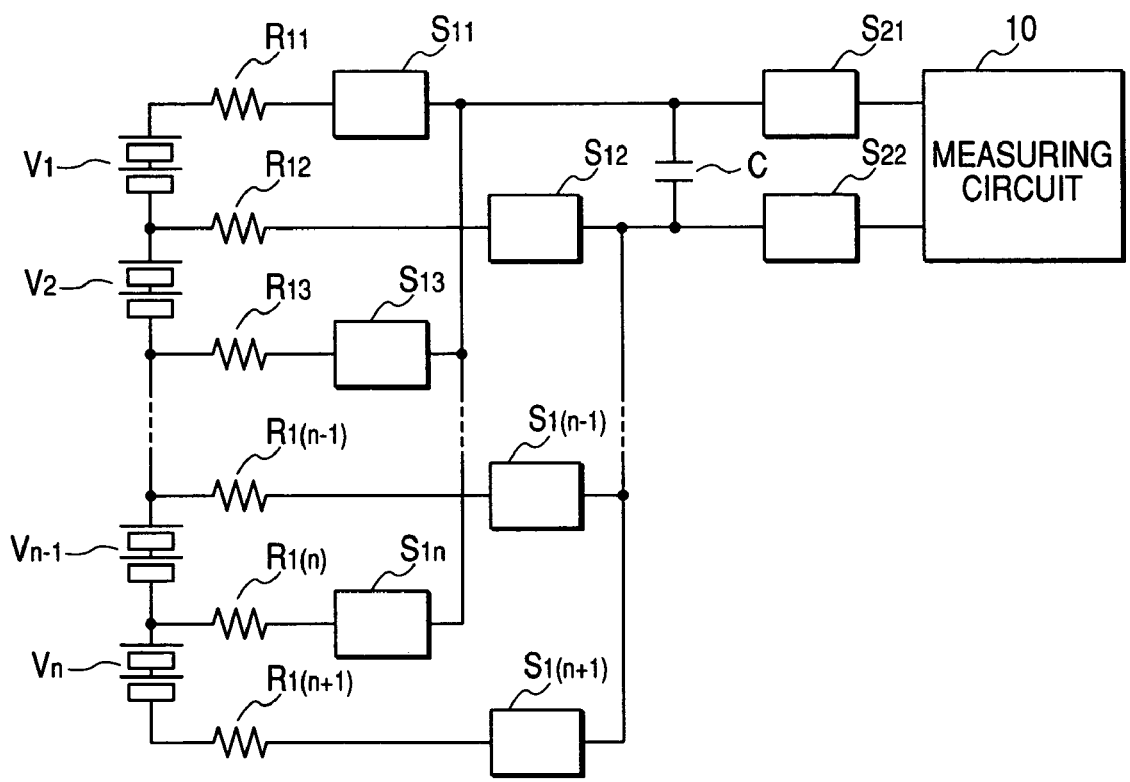
FIG. 1 is a circuit diagram showing a voltage measuring circuit incorporating a flying capacitor circuit as a switching circuit according to a first embodiment of the invention.

A description will now be given of a switching circuit and a voltage measuring circuit according to a first embodiment of the invention by reference to the drawings. FIG. 1 is a circuit diagram showing a voltage measuring circuit configuration incorporating a flying capacitor circuit as a switching circuit according to the invention. As shown in FIG. 1, the voltage measuring circuit has one capacitor C with respect to a combination battery having a plurality of unit cells $V_1$-$V_n$ connected in series, each unit cell having two batteries.

Moreover, the voltage measuring circuit has a plurality of change-over switches $S_{11}$-$S_{1(n+1)}$ for sequentially connecting both ends of each of the unit cells $V_1$-$V_n$ to both ends of the capacitor C, and resistors $R_{11}$-$R_{1(n+1)}$ connected to the change-over switches $S_{11}$-$S_{1(n+1)}$ in series. In this case, (n+1) pieces of change-over switches $S_{11}$-$S_{1(n+1)}$ are provided with respect to n pieces of unit cells $V_1$-$V_n$. The change-over switches $S_{11}$-$S_{1(n+1)}$ and the capacitor C form the switching circuit. Further, both ends of the capacitor C are connected to a measuring circuit 10 for measuring the charging voltage of the capacitor C via measuring switches $S_{21}$ and $S_{22}$.

The operation of the voltage measuring circuit incorporating the flying capacitor will be described. First, a logic circuit (not shown) turns on the change-over switches $S_{11}$ and $S_{12}$ in order to connect both ends of the unit cell $V_1$ to both ends of the capacitor C. Thus, the charging voltage of the capacitor C comes to have a value corresponding to the voltage across the unit cell $V_1$. The logic circuit then turns off the change-over switches $S_{11}$ and $S_{12}$ so as to uncouple the unit cell $V_1$ from the capacitor C so that the measuring circuit 10 is made to measure the charging voltage of the capacitor C by turning on the measuring switches $S_{21}$ and $S_{22}$. The voltage across the unit cell $V_1$ is made measurable by measuring the charging voltage of the capacitor C.

Further, the logic circuit turns on the change-over switches $S_{12}$ and $S_{13}$ in order to connect both ends of the unit cell $V_2$ to both ends of the capacitor C. Hereinafter, the logic circuit controls the change-over switches $S_{11}$-$S_{1(n+1)}$ and the on-off of the measuring switches $S_{21}$ and $S_{22}$. Thus, both ends of each of the unit cells $V_1$-$V_n$ are sequentially connected to the capacitor C, whereupon the charging voltage of the capacitor C, the value of which has thus come to correspond to the voltage across the unit cells $V_1$-$V_n$, is measured by the measuring circuit 10.

As the operations above, each of the change-over switches $S_{12}$-$S_{1n}$ connected to the respective unit cells $V_1$-$V_n$ is shared with two of the unit cells $V_1$-$V_n$. More specifically, the plus side of the unit cell $V_1$ and the minus side of the unit cell $V_2$ connected to the plus side of the unit cell $V_1$ are connected to the capacitor C via the common change-over switch $S_{12}$. Therefore, a two-way current flows through the change-over switches $S_{12}$-$S_{1n}$ between the unit cells $V_1$-$V_n$.

Figure 2:
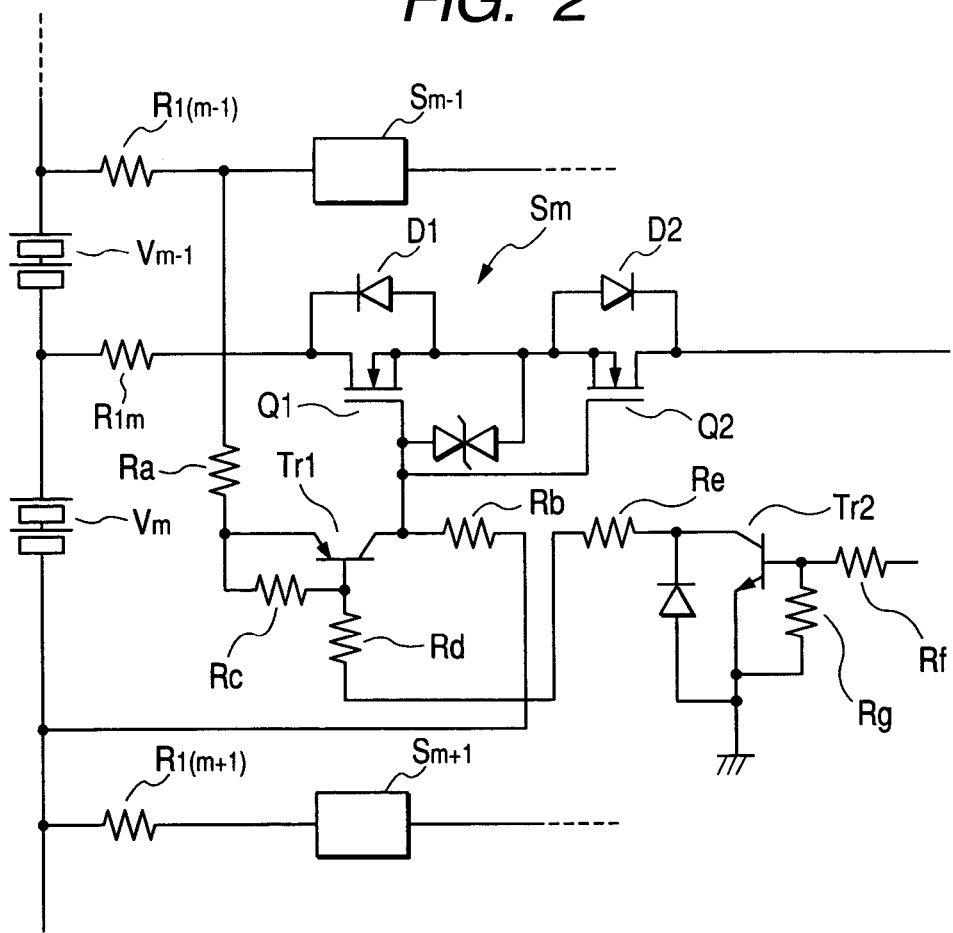
FIG. 2 is a detailed circuit diagram showing change-over switches $S_{12}$-$S_{1(n+1)}$ forming the voltage measuring circuit of FIG. 1.
Figure 3:
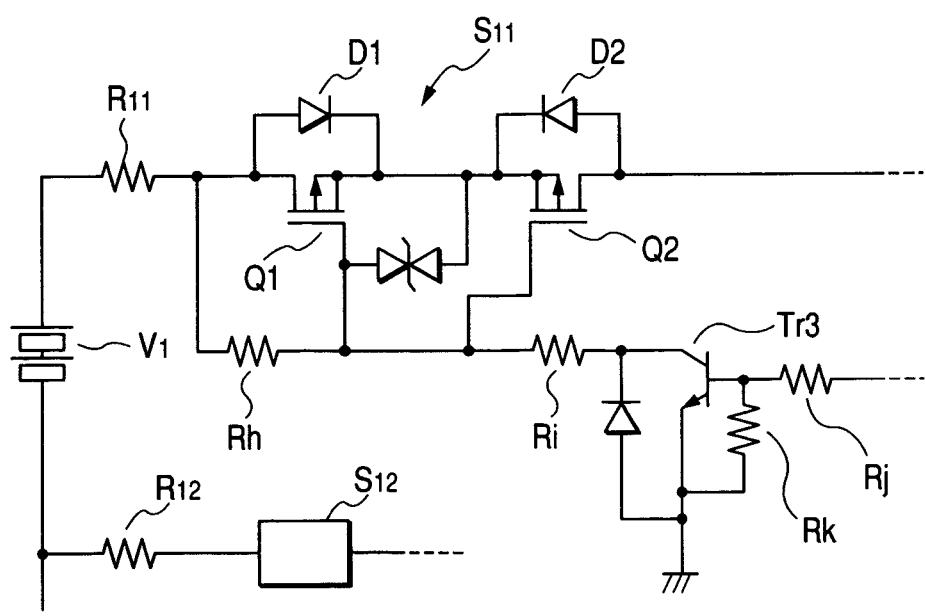
FIG. 3 is a detailed circuit diagram showing a change-over switch $S_{11}$ for use in forming the voltage measuring circuit of FIG. 1.

The detailed configuration of the change-over switches $S_{11}$-$S_{1(n+1)}$ above will be described next by reference to FIGS. 2 and 3. FIG. 2 is a circuit diagram showing any change-over switch $S_m$ out of the change-over switches $S_{12}$-$S_{1(n+1)}$; and FIG. 3, a circuit diagram showing the change-over switch $S_{11}$ connected to the plus side of the unit cell $V_1$ that is to have the highest voltage.

The change-over switches $S_{12}$-$S_{1(n+1)}$ will be described first by reference to FIG. 2. As shown in FIG. 2, the change-over switch $S_m$ is formed with Nch. field effect transistors (FETs) Q1 and Q2 as two semiconductor switches connected in series with the source-drain directions oriented opposite to each other. Therefore, parasitic diodes D1 and D2 are generated across the source-drain of each of the FETQ1 and Q2 with the forward directions oriented opposite to each other.

The gates of the FETQ1 and Q2 are connected between the collector of a transistor Tr1 and a resistor Rb. The emitter of the transistor Tr1 is connected to the plus side of a unit cell $V_{m-1}$ via resistors Ra and $R_{1(m-1)}$ and to the base thereof via a resistor Rc. On the other hand, a resistor Rb is connected to the minus side of a unit cell $V_m$.

The base of the transistor Tr1 is connected to the collector of a transistor Tr2 via resistors Rd and Re. The emitter of the transistor Tr2 is grounded, whereas the base of the transistor Tr2 is connected to the logic circuit (not shown) via a resistor Rf and to the emitter thereof via a resistor Rg.

Thus, the transistor Tr2 is turned on when a 5V control signal is supplied from the logic circuit of the 5V system to the base of the transistor Tr2. When the transistor Tr2 is turned on, the current flows in the order of resistors $R_{1(m-1)}$, Ra, Rc, Rd and Re. Due to the voltage generated in the resistor Rc then, a bias is applied across the emitter-base of the transistor Tr1, so that the transistor Tr1 is turned on.

When the transistor Tr1 is turned on, voltage resulting from dividing the sum total value of voltages across the unit cell $V_m$ and the unit cell $V_{m-1}$ by the resistors $R_{1(m-1)}$ and Ra, and the resistor Rb is applied to the gates of FETQ1 and Q2. Then a bias voltage higher than the source is applied to the gates of the FETQ1 and Q2, so that the FETQ1 and Q2 are turned on. As is obvious from the above description, the resistors Ra-Rg and the transistors Tr1 and Tr2 function as a level shift circuit for subjecting the 5V control signal to level shifting and applying the level-shifted control signal to the gates of the FETQ1 and Q2.

The change-over switch $S_{11}$ will now be described by reference to FIG. 3. As shown in FIG. 3, the change-over switch $S_{11}$ like the change-over switches $S_{12}$-$S_{1(n+1)}$ is formed with two of Pch. FETQ1 and Q2 connected in series with the source-drain directions oriented opposite to each other. Therefore, parasitic diodes D1 and D2 are generated across the source-drain of each of the FETQ1 and Q2 with the forward directions oriented opposite to each other.

The gates of the FETQ1 and Q2 are connected between one end of a resistor Rh and one end of a resistor Ri. The other end of the resistor Rh is connected to the unit cell $V_1$ via the resistor $R_{11}$, whereas the other end of the resistor Ri is grounded via the collector-emitter of a transistor Tr3. The base of the transistor Tr3 is connected to the logic circuit (not shown) via a resistor Rj and the emitter thereof via a resistor Rk.

When the 5V control signal is supplied from the logic circuit of the 5V system to the base of the transistor Tr3, the transistor Tr3 is turned on. When the transistor Tr3 is turned on, voltage resulting from dividing the voltage on the plus side of the unit cell $V_1$ by the resistor $R_{11}$, the resistor Rh and the resistor Ri is applied to the gates of FETQ1 and Q2. Then a bias voltage lower than the source is applied to the FETQ1 and Q2, so that the FETQ1 and Q2 are turned on. As is obvious from the above description, the resistors Rh-Rk and the transistor Tr3 function as a level shift circuit for subjecting the 5V control signal to level shifting and applying the level-shifted control signal to the gates of the FETQ1 and Q2.

With the above voltage measuring circuit incorporating the flying capacitor, the change-over switches $S_{11}$-$S_{1(n+1)}$ are formed with the FETQ1 and Q2 connected in series with the source-drain directions oriented opposite to each other. Therefore, the use of FETs as the change-over switches $S_{11}$-$S_{(n+1)}$ makes a two-way current flow therethrough.

Moreover, the forward directions of the parasitic diodes D1 and D2 generated in the respective source-drain directions are oriented opposite to each other by connecting the two FETQ1 and Q2 such that the source-drain directions are oriented opposite to each other. While the FETQ1 and Q2 are off, the current is prevented from flowing through the parasitic diodes D1 and D2 in a direction opposite to the direction of the current in the on state, whereby the FETS$_{11}$-$S_{1(n+1)}$ are usable as change-over switches that are semiconductor switches excellent in cost, size, durability, response speed and so on.

With the voltage measuring circuit above, the level shift circuit operates to subject the control signal to level shifting and to apply the level-shifted control signal to the gates of the FETQ1 and Q2. The on-off of the FETQ1 and Q2 whose sources are connected to a high voltage can be controlled by the level shift circuit using the control signal generated by the logic circuit of the 5V system, whereby it is feasible to bring about a reduction in costs without necessitating using expensive photo MOSs.

As the FETQ1 and Q2 of the change-over switch $S_{11}$ are connected to the plus side of the unit cell $V_1$ having the highest voltage, any voltage higher than that of the source is not applicable to the gates of the FETQ1 and Q2, so that the Nch. FET is not usable. Accordingly, like the voltage measuring circuit described above, expensive Pch. FETs are used as the FETQ1 and Q2 held by the change-over switch $S_{11}$ connected to the plus side of the unit cell $V_1$ set on the highest voltage side and Nch. FETs are used for the rest of change-over switches $S_{12}$-$S_{1(n+1)}$ in an attempt to reduce costs.

The two-way current as described above is made to flow in the measuring switches $S_{21}$ and $S_{22}$ by using the FETQ1 and Q2 as the measuring switches $S_{21}$ and $S_{22}$. Moreover, like the change-over switches $S_{11}$-$S_{1(n+1)}$, the forward directions of the parasitic diodes D1 and D2 generated in the source-drain directions are oriented opposite to each other by connecting two of the FETQ1 and Q2 such that the source-drain directions are oriented opposite to each other. Then the current is prevented from flowing in the reverse direction even though the FETQ1 and Q2 are in the off state.

With respect to the change-over switches $S_{11}$ and $S_{1(n+1)}$, two of the FETQ1 and Q2 connected in series have been employed such that the source-drain directions are oriented opposite to each other according to the above embodiment of the invention. However, since only a unidirectional current flows in the change-over switches $S_{11}$ and $S_{1(n+1)}$, it is conceivable to employ unidirectional switches such as transistors.

Second Embodiment

Figure 4:
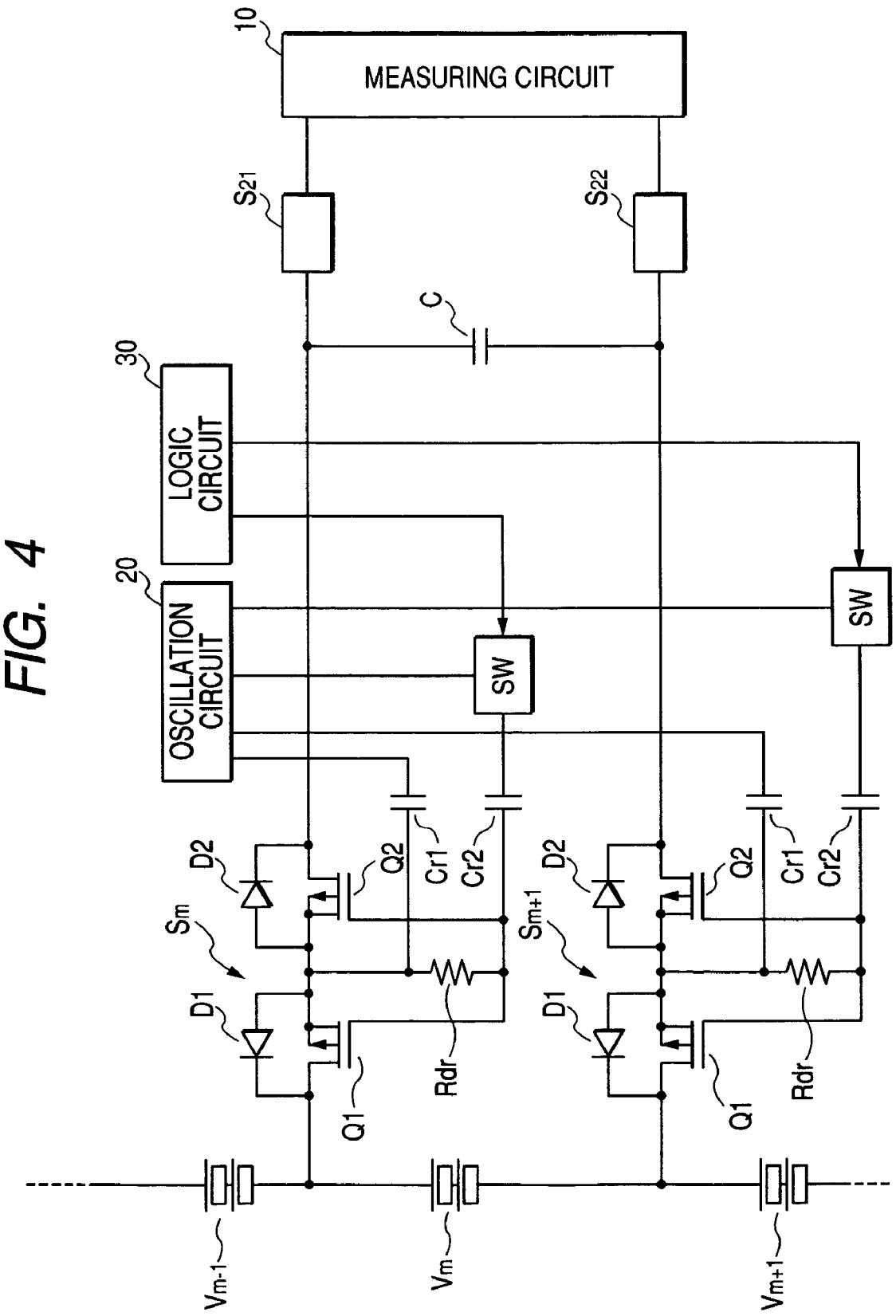
FIG. 4 is a circuit diagram showing a voltage measuring circuit incorporating a flying capacitor circuit as a switching circuit according to a second embodiment of the invention.
Figure 5:
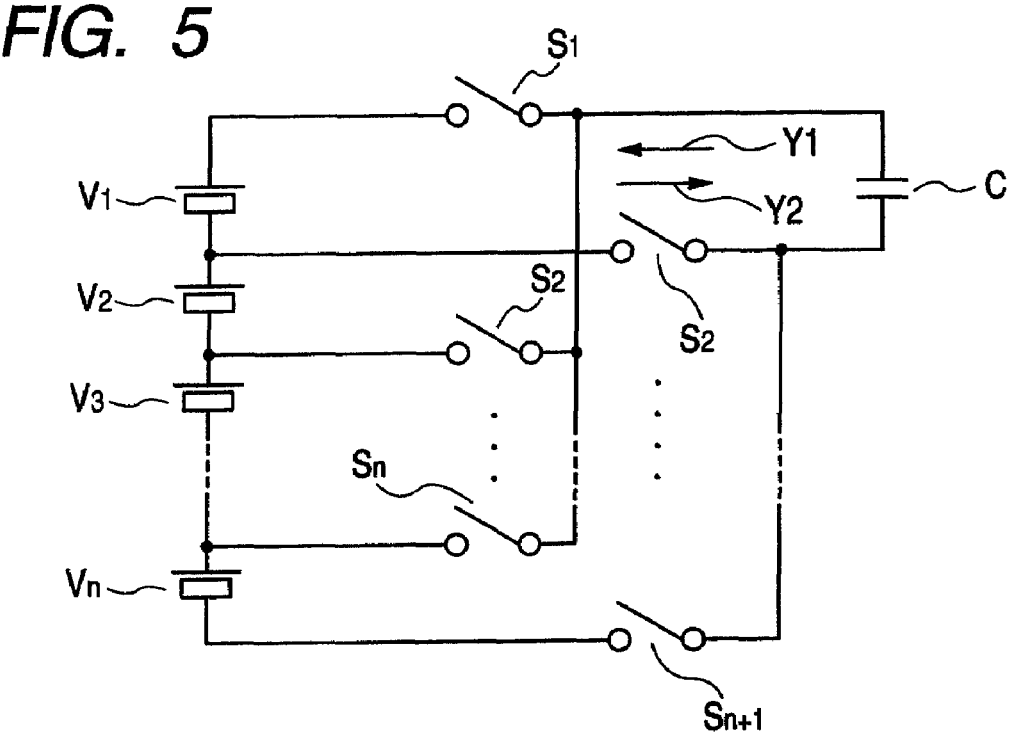
FIG. 5 is a circuit diagram showing an example of a related flying capacitor circuit.
Figure 6:
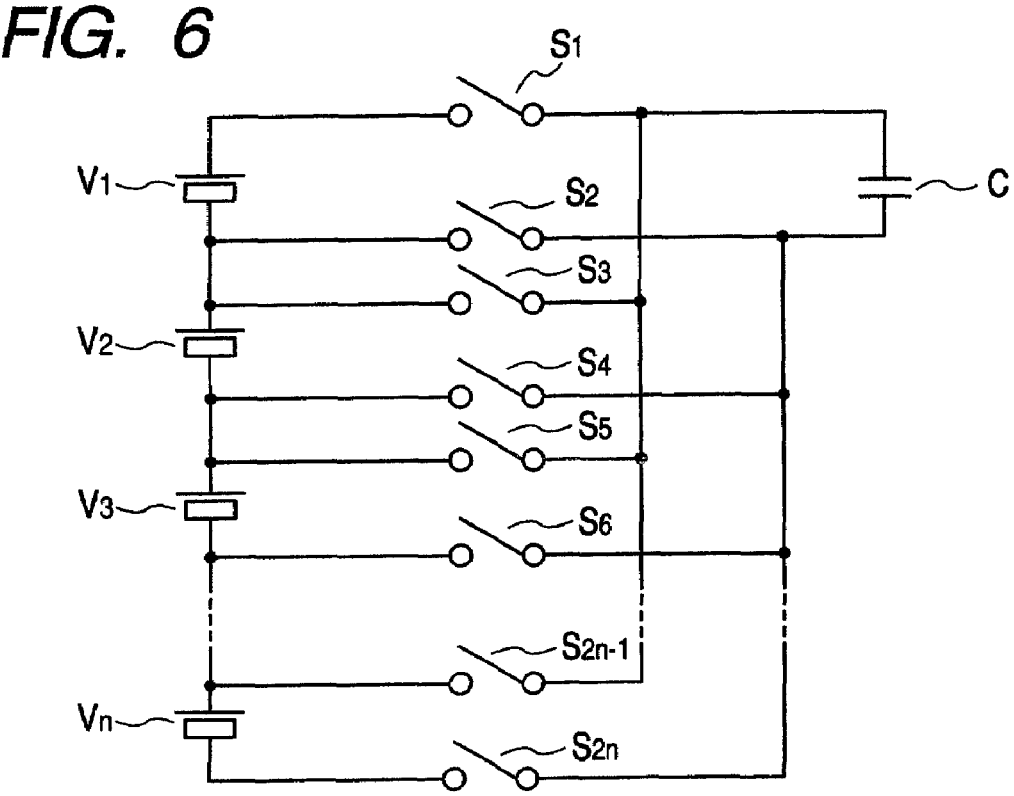
FIG. 6 is a circuit diagram showing an example of a related flying capacitor circuit.

A description will now be given of a switching circuit and a voltage measuring circuit according to a second embodiment of the invention by reference to the drawings. FIG. 4 is a circuit diagram showing a voltage measuring circuit configuration incorporating a flying capacitor circuit as a switching circuit according to the invention. Referring to FIG. 4, wherein like reference characters designate like or corresponding parts in FIGS. 1-3 according to the first embodiment of the invention above and the detailed description thereof will be omitted.

The second embodiment of the invention is different from the first embodiment in that a drive circuit of the change-over switches $S_{11}$-$S_{1(n+1)}$ is provided. Although the gate voltages of the FETQ1 and Q2 forming the change-over switches $S_{11}$-$S_{1(n+1)}$ are obtained by dividing the voltage of the combination battery according to the first embodiment of the invention, the following arrangement is made according to the second embodiment of the invention. As shown in FIG. 4, the drive circuit of each of the FETQ1 and Q2 has a resistor Rdr (resistance element) provided across the gate-source of each of the FETQ1 and Q2, capacitor Cr1 and Cr2 (drive capacitors) provided at both ends of the resistor Rdr, and an oscillation circuit 20 for applying an AC voltage across the resistor Rdr via the capacitors Cr1 and Cr2.

Further, the drive circuit has a drive switch SW provided between the oscillation circuit 20 and the capacitor Cr2, and a logic circuit 30 for outputting a control signal for designating the on-off of the drive switch SW.

The operation of the drive circuit of the voltage measuring circuit thus configured will now be described. When the logic circuit 30 feeds the control signal into the drive switch SW, the drive switch SW is turned on and the AC voltage from the oscillation circuit 20 is applied across the resistor Rdr. Thus, a bias is applied across the source-gate of the FETQ1 and Q2, so that the two FETQ1 and Q2 can be turned on. When the logic circuit 30 stops feeding the control signal into the drive switch SW, on the other hand, the drive switch SW is turned off and the FETQ1 and Q2 are also turned off because a AC voltage supplying path is shut off.

In the above configuration, as the oscillation circuit 20 can be isolated by the capacitors Cr1 and Cr2 from the combination battery in a direct-current mode, the oscillation circuit 20 and the logic circuit 30 is allowed to make the 5V lower voltage source a power supply, for example, which is different from the combination battery. Accordingly, the drive switch SW provided between the oscillation circuit 20 and the capacitor Cr2, for example, can dispense with the high voltage.

The drive switch SW for turning on-off the AC voltage applied to the resistor Rdr and the logic circuit 30 for controlling the drive switch SW are provided, whereby only one oscillation circuit 20 can be provided with respect to the plurality of change-over switches $S_{11}$-$S_{1(n+1)}$, so that the oscillation circuit 20 need not be provided for each of the change-over switches $S_{11}$-$S_{1(n+1)}$. Therefore, it is possible to not only make the configuration simple but also reduce costs.

Providing the capacitor in parallel to the resistor Rdr is conceivable according to the second embodiment of the invention. With this arrangement, the resistor Rdr and the capacitor function as a filter and the FETQ1 and Q2 are prevented from being inadvertently turned on by noise or the like.

What is claimed is:

1. A switching circuit, comprising:
   a capacitor;
   a combination battery, having a plurality of unit cells connected in series, each of the unit cells containing battery;
   a plurality of change-over switches, sequentially connecting both ends of the each of the unit cells to the capacitor, wherein each of the change-over switches has two semiconductor switches connected in series so that the source-drain directions thereof are oriented opposite to each other;
   a first logic circuit, outputting a control signal for designating an on-off of at least one of semiconductor switches; and
   a level shift circuit including a semiconductor switch, and when the semiconductor switch is open, level shifting a voltage of the control signal so that the level shifted control signal has a voltage higher than the control signal and feeding the level-shifted control signal to a gate of the at least one of the semiconductor switches;
   wherein a voltage is applied to the at least one of the semiconductor switches by a first cell of the plurality of unit cells, and a voltage of the level shifted control signal is applied to the gate of the at least one of the semiconductor switches by the first cell and a second cell of the plurality of unit cells, which is connected in series to the first cell.

2. The switching circuit as set forth in claim 1, wherein a minus side terminal of one of the unit cells and a plus side terminal of an adjoining unit cell connected to the minus side terminal of the one unit cell are connected to the capacitor via the common change-over switch.

3. A switching circuit, comprising:
   a capacitor;
   a combination battery, having a plurality of unit cells connected in series, each of the unit cells containing battery;
   a plurality of change-over switches, sequentially connecting both ends of the each of the unit cells to the capacitor, wherein each of the change-over switches has two semiconductor switches connected in series so that the source-drain directions thereof are oriented opposite to each other;
   a resistance element, provided across the source-gate of the respective semiconductor switches;
   drive capacitors, respectively connected to both ends of the resistance element; and
   an oscillation circuit, applying AC voltage to both ends of the resistance element via the drive capacitors.

4. The switching circuit as set forth in claim 3, further comprising:
   a drive switch, provided between the oscillation circuit and the drive capacitors; and
   a second logic circuit, outputting a control signal for designating the on-off of the drive switch.

5. The switching circuit as set forth in claim 1, wherein the semiconductor switch connected to the plus side terminal of the unit cell located on the highest voltage side out of the change-over switches is of a P channel type; and the other of the conductor switches is a N channel type.

6. A voltage measuring circuit, comprising:
   the switching circuit according to any one of claims 1 through 2 and 3 through 5;
   a voltage measuring unit, measuring the voltage across the capacitor; and
   a measuring switch, connected between both ends of the capacitor and the voltage measuring unit,
   wherein the measuring switch has two semiconductor switches connected in series with the source-drain directions oriented opposite to each other.

7. The switching circuit as set forth in claim 1,
   wherein the level shift circuit level-shifts the voltage of the control signal to be higher than a voltage applied to a source of the at least one of the semiconductor switches by using two of the plurality of unit cells.

8. The switching circuit as set forth in claim 1, wherein the at least one of the semiconductor switches is connected to the first cell, and the gate of the at least one of the semiconductor switches is connected via the semiconductor switch of the level shift circuit to the second cell.

9. The switching circuit as set forth in claim 1, wherein the semiconductor switch of the level shift circuit is a transistor.

* * * * *